US008341183B2

(12) United States Patent
Peckham

(10) Patent No.: US 8,341,183 B2
(45) Date of Patent: Dec. 25, 2012

(54) REPRESENTING THE ALLOCATION OF INTEGERS

(75) Inventor: Stephen B. Peckham, Austin, TX (US)

(73) Assignee: International Business Machines Corporation, Armonk, NY (US)

(*) Notice: Subject to any disclaimer, the term of this patent is extended or adjusted under 35 U.S.C. 154(b) by 928 days.

(21) Appl. No.: 12/249,486

(22) Filed: Oct. 10, 2008

(65) Prior Publication Data
US 2010/0094903 A1 Apr. 15, 2010

(51) Int. Cl.
G06F 7/00 (2006.01)
G06F 17/30 (2006.01)

(52) U.S. Cl. ......... 707/791; 707/797; 707/798; 707/803
(58) Field of Classification Search ............ None
See application file for complete search history.

(56) References Cited

U.S. PATENT DOCUMENTS

| 6,567,815 | B1 | 5/2003 | Rubin et al. | |
|---|---|---|---|---|
| 6,681,200 | B2 | 1/2004 | Zee | |
| 6,934,907 | B2 | 8/2005 | Brunet et al. | |
| 6,976,021 | B2* | 12/2005 | Ramakrishnan | 1/1 |
| 7,225,186 | B2 | 5/2007 | Rao | |
| 7,624,304 | B2* | 11/2009 | Thiagarajan et al. | 714/25 |
| 2002/0138515 | A1 | 9/2002 | Brunet et al. | |
| 2002/0198886 | A1* | 12/2002 | Ramakrishnan | 707/100 |
| 2005/0050060 | A1* | 3/2005 | Damm et al. | 707/100 |
| 2005/0216445 | A1 | 9/2005 | Rao | |
| 2006/0271541 | A1 | 11/2006 | Snyder | |
| 2008/0304421 | A1* | 12/2008 | Ramasubramanian et al. | 370/251 |
| 2008/0313196 | A1* | 12/2008 | Furusho | 707/100 |

* cited by examiner

Primary Examiner — Kuen S Lu
Assistant Examiner — Berhanu Mitiku
(74) Attorney, Agent, or Firm — Stephen J. Walder, Jr.; Libby Z. Toub

(57) ABSTRACT

Methods and arrangements of representing the allocation of integers are discussed. Embodiments include transformations, code, state machines or other logic to represent the allocation of integers. An embodiment may involve representing a first allocation of integers via a set of nodes of a tree. In the representation, a data structure in a node may represent, for each integer in a set of integers, whether the integer is allocated or free. The embodiment may also involve representing a subsequent allocation. The representing may include adding a new node to the nodes of the tree for the first allocation. The subsequent allocation may consist of freeing of an integer allocated in the first allocation. The data structure of the new node may represent that the integer is free.

21 Claims, 7 Drawing Sheets

KEY:
SUBTREE ▢
NODE ◯

KEY:
SUBTREE ☐
NODE ◯

REPRESENTING THE ALLOCATION OF INTEGERS

BACKGROUND OF THE INVENTION

The present invention is in the field of data structures for computing devices. More particularly, the present invention relates to methods and arrangements to represent the allocation of integers.

Many processes may require keeping track of the allocation of a set of integers. Each integer in the set may be in use (allocated) or not in use (free). An operating system, for example, may use integers to identify resources, such as lists of DLLs, used by programs running under the operating system. To keep track of the allocation, a process may use a tree structure. A tree consists of nodes and pointers. A node points to its child nodes. The initial node is called the root. To represent an allocation with a tree, the nodes of the tree may contain data structures, each representing the allocation of a subset of the set of integers.

One type of tree is a binary tree. In a binary tree, each node has at most two children, but may have zero or one. A binary tree may be ordered. The nodes of the binary tree may be may be numbered or otherwise labeled so that the left children of a node have a label which is less than the label of the node, and the right children have a label which is greater than the label of the node. One type of ordered binary tree is numbered in preorder: The nodes of a left subtree are numbered, a node is numbered, and the nodes in the right subtree are numbered.

FIG. 1A depicts the representation of the allocation of the integers from 1 to 15 with a binary tree 100 numbered in preorder. For simplicity, in the representation of FIG. 1A, each node represents the state of a single integer and the number of the node coincides with the integer represented by the node; that is, node 8 represents the state of the allocation of integer 8. The label "A" in a node represents an allocated integer, and the label "F" represents a free integer. In the diagram of FIG. 1A, two integers are free, namely 1 and 13. The other integers are allocated. Binary tree 100 contains 15 nodes.

BRIEF SUMMARY OF THE INVENTION

A method and arrangement of representing the allocation of integers is presented. One embodiment provides a method of representing the allocation of integers. The embodiment may involve representing a first allocation of integers via a set of nodes of a tree. In the representation, a data structure in a node may represent, for each integer in a set of integers, whether the integer is allocated or unallocated (free). The embodiment may also involve representing a subsequent allocation, in which an integer allocated in the first allocation is freed. The representing may include adding a new node to the nodes of the tree for the first allocation. The data structure of the new node may represent that the integer is free.

BRIEF DESCRIPTION OF THE SEVERAL VIEWS OF THE DRAWINGS

An explanation of the invention will become apparent upon reading the following detailed description and upon reference to the accompanying drawings in which like references may indicate similar elements.

DETAILED DESCRIPTION OF THE INVENTION

The following is a detailed description of embodiments of the invention depicted in the accompanying drawings. The embodiments are in such detail as to clearly communicate the invention. However, the amount of detail offered is not intended to limit the anticipated variations of embodiments; but on the contrary, the intention is to cover all modifications, equivalents, and alternatives falling within the spirit and scope of the present invention as defined by the appended claims. The detailed descriptions below are designed to make such embodiments obvious to a person of ordinary skill in the art.

Generally speaking, methods and arrangements of representing the allocation of integers are contemplated. Embodiments include transformations, code, state machines or other logic to represent the allocation of integers. The embodiments may receive a request to allocate an integer. In response, the embodiments may provide an integer for allocation and may update the representation of the allocation of integers. In addition, the embodiments may receive a specification of an integer that has been unallocated (free), and may update the representation of the allocation of integers.

An embodiment may involve representing a first allocation of integers via a set of nodes of a tree. In the representation, a data structure in a node may represent, for each integer in a set of integers, whether the integer is allocated or free. The embodiment may also involve representing a subsequent allocation. The representing may include adding a new node to the nodes of the tree for the first allocation. The subsequent allocation may consist of freeing of an integer allocated in the first allocation. The data structure of the new node may represent that the integer is free.

Some embodiments may involve deleting a node to represent allocating a currently free integer. In many embodiments, the representation may keep track of the largest allocated integer and the largest free integer less than the largest allocated integer. The tree representing an allocation may represent only the integers less than or equal to the largest free integer. In several embodiments, the method may include representing the allocation of integers via a binary tree labeled in preorder. In further embodiments, the data structure of a node may represent the allocation of multiple integers. For example, a 64-bit number may represent the allocation of a sequence of 64 integers. A 1 bit may represent that the corresponding integer is free and a 0 bit may represent that the corresponding integer is allocated.

Figure 1A:
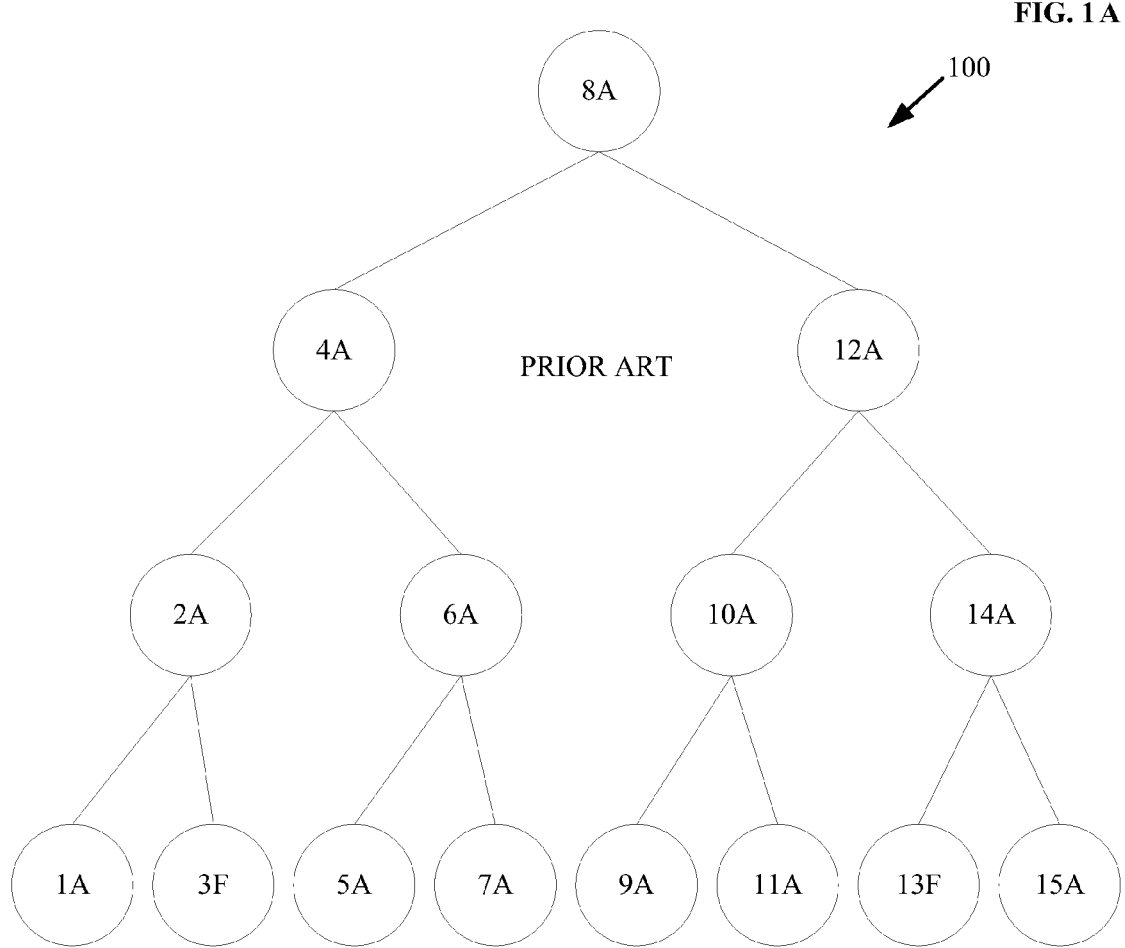
FIG. 1A depicts an example representation of the allocation of integers via an ordered binary tree.
Figure 1B:
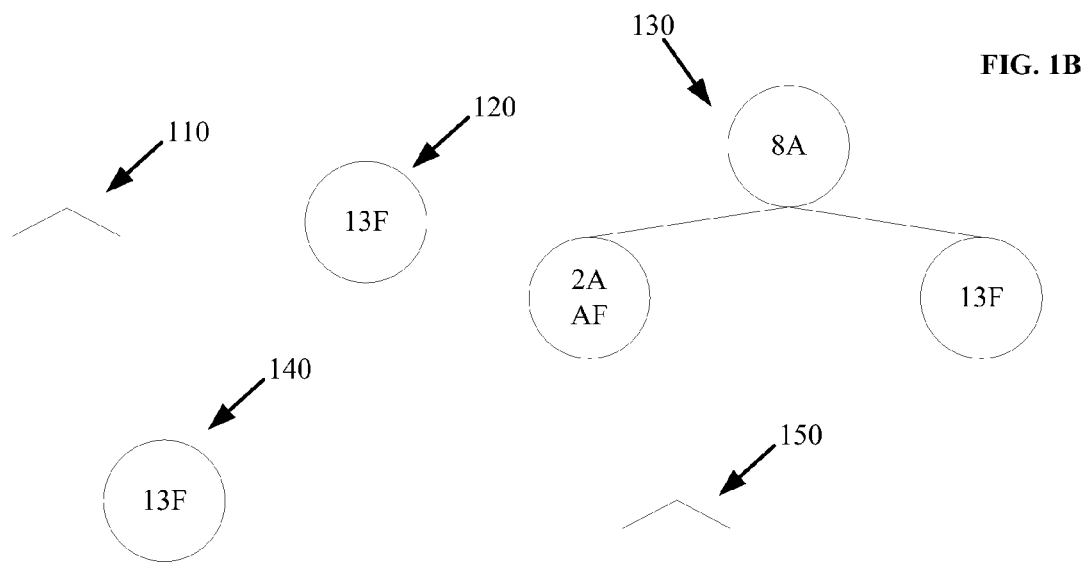
FIG. 1B depicts an example representation of the allocation of integers via an ordered binary tree in accordance with embodiments of the invention.

Turning to FIG. 1B, depicted is a series of trees (110, 120, 130, 140, and 150) which may be generated by some embodiments of the invention. The series of trees (110, 120, 130, 140, and 150) represent different allocations of the integers from 1 to 15. As with tree 100 of FIG. 1A, in the representations of series of trees (110, 120, 130, 140, and 150), the number of a node coincides with an integer represented by the node, the label "A" in a node represents an allocated integer, and the label "F" represents a free integer. In the representation of the series of trees (110, 120, 130, 140, and 150), labels below the node number represent an allocation of integers by children of the node. Thus, the "AF" label below the number of node 2 indicates that node 1, the left child of node 2, is allocated and node 3, the right child of node 2, is free. In addition, the representation includes keeping track of the largest allocated integer (herein designated as max_allocated) and the largest free integer less than max_allocated (herein designated as max_free). The tree representing an allocation only represents the integers between 1 and max_free. Further, in the representation of the series of trees (110, 120, 130, 140, and 150), the absence of a node indicates that the corresponding integer is allocated.

Initially, in the allocation represented by tree 110, none of the integers from 1 to 15 are allocated. Max_free=max_allocated=0. The allocation tree 110 is empty (contains no nodes). Next, one by one, the integers from 1 to 15 are allocated. In the example, whenever an integer is needed for allocation, the smallest free integer is selected. At this point, max_allocated=15. Max_free=0, since no integers less than 15 are free. Accordingly, the representational tree is empty. Thus, tree 110 represents each of these allocations.

Next, in the allocation represented by tree 120, node 13 is freed. Tree 120 contains a single node, node 13, with the label "F". Max_free=13, and max_allocated=15. To represent the freeing of an integer, a node was added to tree 110. Next, in the allocation represented by tree 130, node 3 is freed. To represent this, node 2 is added to the existing node 13 of tree 120. In addition, node 8 is added, to preserve the tree structure. Max_free=13, and max_allocated=15.

Tree 130 represents the same allocation of the integers from 1 to 15 as does tree 100 of FIG. 1B. In both, the integers 3 and 13 are free, and the other integers from 1 to 15 are allocated. In the representation of tree 130, the "F" in node 13 indicates that integer 13 is free and the F below the number of node 2 indicates that a child node, node 1 is free. The allocation of integers 1, 2, and 8 are represented explicitly, by the label "A" after the node number of nodes 2 and 8 and the label "A" beneath the node number of node 2. The allocations of the other integers are represented implicitly. That integers 4-7, 9-12, and 14-15 are allocated is represented by the absence of the corresponding nodes.

Next, in the allocation represented by tree 140, another integer is allocated. Since 3 is the smallest free integer, it is selected for allocation. To represent the allocation, node 2 is deleted from the tree. In addition, node 8 is no longer needed to preserve tree structure, and is deleted. The resulting tree, tree 140, contains the single node 13. Max_free=13, and max_allocated=15. Finally, in the tree represented by tree 150, another node is allocated. Node 13 is selected, since it is the smallest free integer. To represent the allocation, node 13 is deleted from tree 140 and the representational tree, tree 150, is empty. Max_free=0, and max_allocated=15.

In the representations of FIG. 1B, the trees contain only nodes which represent free integers and nodes used to maintain a tree structure. Such representations are called sparse representations. For example, tree 130 is sparse. Node 2 and node 13 are used to represent free integers, 3 and 13 respectively. Node 8 is added to generate the tree structure. Nodes 2 and 13 may not be joined with a pointer without adding an additional node, because neither is an ancestor of the other. In contrast with the 15 nodes used in the representation of tree 100 of FIG. 1A, the representation of tree 130 uses only 3 nodes. The number of nodes shown in trees 100 and 130 may be representative of the amounts of memory that may be needed in implementations of the two methods of representing the allocating of integers. Accordingly, some embodiments of the invention may require less memory than current methods of representing the allocation of integers.

Figure 2:
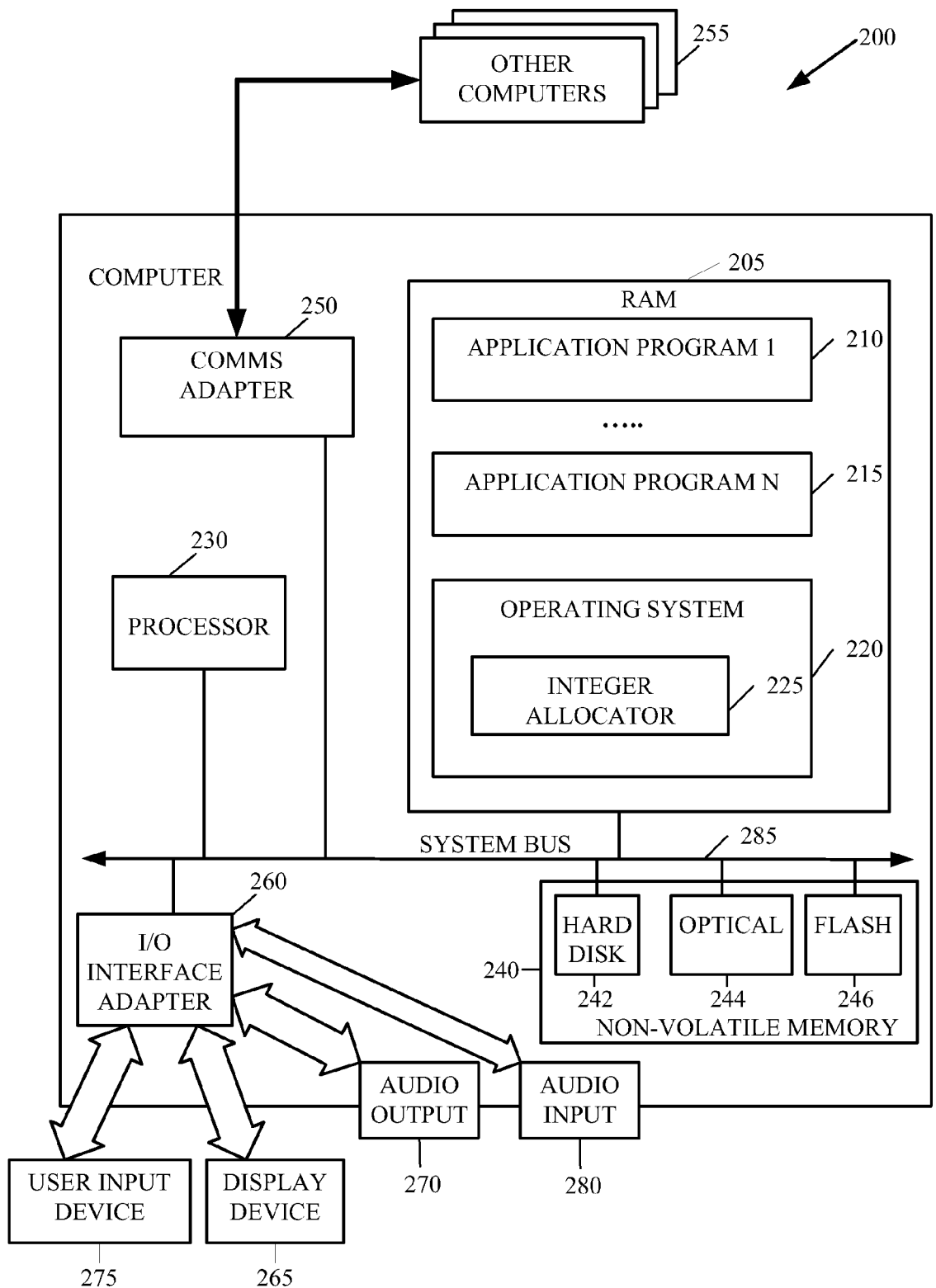
FIG. 2 depicts an example computer to represent the allocation of integers in accordance with embodiments of the invention.

FIG. 2 depicts an embodiment of a computer 200 that may represent the allocation of integers in accordance with embodiments of the invention. Computer 200 includes random access memory (RAM) 205, a processor 230 or CPU, non-volatile memory 240, a communications adapter 250, and an Input/Output (I/O) interface adapter 260 connected by system bus 285. Stored in RAM 205 are application program 2 (210), application program N (215), and operating system 220. The ellipsis between application program 2 and application program N indicates that RAM 205 may also contain other application programs.

Operating system 210 is a layer of system software that may make system resources, including memory, input/output resources, and processors, available to other programs. Operating system 210 may also control allocation and authorization for access to computer resources. Operating systems may perform low-level, basic tasks, such as recognizing input from a keyboard, sending output to a display screen, keeping track of files and directories on a magnetic disk drive, and controlling peripheral devices such as disk drives and printers. The operating system is also responsible for security, ensuring that unauthorized users do not access the system.

Operating system 210 includes integer allocator 225. Integer allocator 225 may record the allocation and freeing of integers in the process of performing system operations. Integer allocator 225 may represent the allocation of integers by means of a tree structure. Data structures of the nodes may represent whether integers are allocated or free. In some embodiments, the representation of integer allocations may be a sparse representation.

Operating system 210 may include UNIX™, Linux™, Solaris™, Microsoft Windows XP™ and Vista™, AIX™, IBM's i5/OS™ and other operating systems useful for representing the allocation of integers as will occur to those of skill in the art. The modules shown in RAM 205 are for explanation, not for limitation. In other embodiments, modules other than an operating system may provide for the allocation of integers.

Application programs 1 (210) and N (215) and operating system 220 are shown in RAM 205 in FIG. 2, but many components of such software may be stored in non-volatile memory 240 also. Further, while the components of such are shown simultaneously present in RAM, in some other embodiments, only some of the components of RAM 205 may be present at any given time.

Non-volatile computer memory 240 may be implemented as a hard disk drive 242, optical disk drive 244, electrically erasable programmable read-only memory space (EEPROM or Flash memory) 246, RAM drives (not shown), or as any other kind of computer memory as will occur to those of skill in the art. Communications adapter 250 may implement the hardware level of data communications through which one computer sends data communications to other computers, such as other computers 255, directly or through a network. Communications adapter 250 may provide an interface to operating system 210 and other modules utilizing it. The interface may specify the form in which data is to be passed to the communications adapter, and the form in which data is received from the communications adapter. Examples of communications adapters include modems for wired dial-up communications, Ethernet (IEEE 802.3) adapters for wired network communications, 802.21a/b/g/n adapters for wireless network communications, and mobile broadband cards.

I/O interface adapter 260 implements user-oriented I/O through, for example, software drivers and computer hardware for controlling output to display devices such as display device 265 and audio output device 270 as well as user input from user input device 275 and audio input device 280. User input device 275 may include both a keyboard and a mouse. Some embodiments may include other user input devices such as speech interpreters, bar code scanners, text scanners, tablets, touch screens, and/or other forms of user input devices. Audio output 270 may include speakers or headphones and audio input device 280 may include a microphone or other device to capture sound.

The computer and components illustrated in FIG. 2 are for explanation, not for limitation. In other embodiments, embedded systems, PDAs, cell phones, BlackBerries® and other devices may represent the allocation of integers in accordance with embodiments of the invention. In other embodiments, modules to represent the allocation of integers may be implemented in hardware, firmware, or in state machines or may form a component of an operating system. In several embodiments, a computing device may contain two or more processors. In various embodiments, a computing device may use point-to-point interconnects to connect processors or to connect a processor and another element of the computing system.

Figure 3:
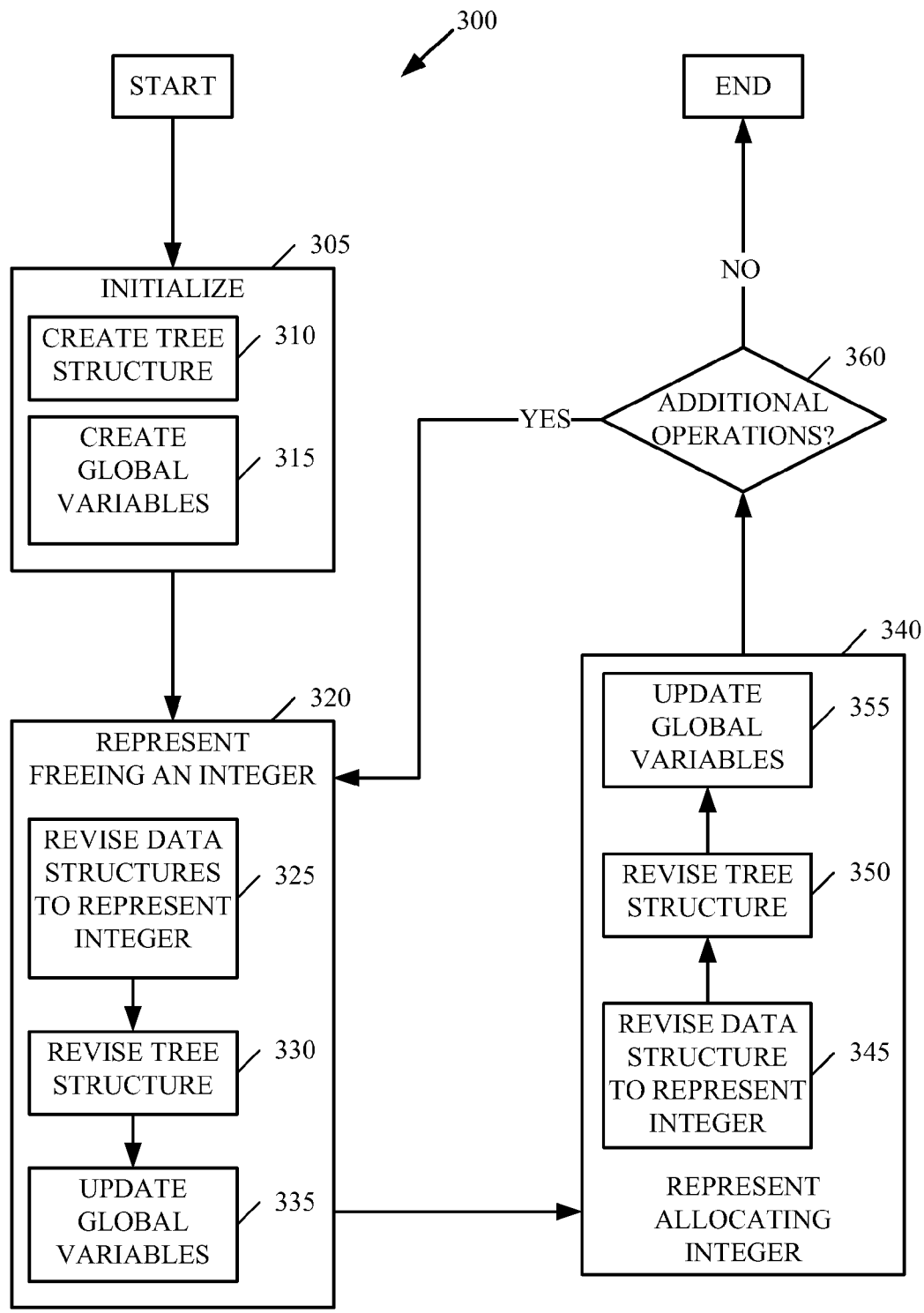
FIG. 3 depicts a flowchart of an exemplary method to represent the allocation of integers in accordance with embodiments of the invention.

FIG. 3 depicts a flowchart 300 of an embodiment of a method to represent the allocation of integers. The method may produce trees, such as the series of trees of FIG. 1B, to represent the allocation of integers. The method of flowchart 300 may include initializing data structures for the representation (element 305). The initialization may include creating a tree (element 310), such as empty tree 110 of FIG. 1B. In many embodiments, the tree may be a binary tree with nodes numbered in preorder, such as the node numbering of tree 100 of FIG. 1A. The nodes may contain data structures representing the allocation of integers. In some embodiments, the data structure of a node may represent the allocation of multiple integers, such as a sequence of 64 consecutive integers. In such embodiments, node 1 may represent the allocation of the integers from 1 to 64, node 2 the integers from 65 to 128, and node n the integers from 64×(n−1)+1 to 64×n. The data structure may consist of a binary number with each bit representing the allocation of an integer. A 1-bit for example, may represent that the corresponding integer is free, and a 0-bit may represent that the corresponding integer is allocated. With this representation, where an 8-bit binary number represents an allocation from the integers from 1 to 8, the binary number 01100110 may represent that integers 1, 4, 5, and 8 are allocated and integers 2, 3, 6, and 7 are free. In several embodiments, labeling a pointer to a child may represent that all of the integers represented by the nodes of the subtree rooted at the child are uniformly allocated or uniformly free.

Thus, in tree 150 of FIG. 1B, the pointers of node 3 represent that the integers of the subtree at node 1 are uniformly allocated and the subtree rooted at node 3 is uniformly free. In both cases, the subtree consists of a single node and represents a single integer.

The initializing of element 305 may include initializing global variables to describe the state of the allocation (element 315). In some embodiments, the global variables may specify the greatest integer allocated (max_allocated) and the greatest unallocated integer that is less than max_allocated (max_free). All integers greater than max_allocated in the set of integers available for allocation may be free. The following diagram represents the division of the integers available for allocation into segments based upon max_free and max_allocated:

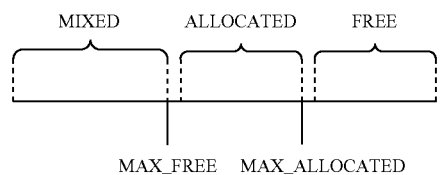

As shown by the diagram, the specification of max_free and max_allocated may divide the set of integers available for allocation into three or fewer segments. The integers in the first segment (mixed), {n: n≦max_free}, may be either free or allocated. The integers in the middle segment (allocated), {n: max_free<n≦max_allocated}, are all allocated. The integers in the third segment, {n: n>max_allocated} are all free. Initially, max_free and max_allocated are set to 0, and all integers are in the "free" segment. As integers are allocated, max_allocated may be incremented. As integers are freed, max_free may be incremented. In addition, if max_allocated is freed, then it is decremented.

The use of max_free and max_allocated may reduce the size of the tree representing an allocation of integers. It is only necessary for the tree to represent the integers from 1 to max_free, the integers in the first segment of the above diagram. The status of allocation of integers in the second and third segments is known.

The method of flowchart 300 may include representing the freeing of an integer (element 320). The representation may include revising data structures to represent the freed integer (element 325), such as the data structure of a node. For example, in the representation of FIG. 1B, the "A" in node 8 may be changed to an "F" to represent the freeing of the integer 8. Where the bits of binary number represent integers, a bit may be changed to represent the change of allocation. In the example set forth above, changing the last bit of the binary number 01100110 to a 1 may represent the freeing of the integer 8.

The representation the freeing of an integer may also include revising the tree structure (element 330). When the tree does not contain a node representing the freed integer, a node may be added to the tree, as in the examples of FIG. 1B. Thus, tree 120 was created by adding a single node to the empty tree 110 to represent the freeing of integer 13, and tree 130 was created by adding the node 2 to represent the freeing of integer 3.

In some embodiments, additional nodes may be added to preserve the tree structure. Thus, in the example of FIG. 1B, tree 130 also includes node 8, the parent of nodes 2 and 13. The structural node was added to join nodes 2 and 13 into a tree structure. In some embodiments, the following algorithm may describe the process of determining whether to add a structural node after adding a node to a tree representing an allocation of integers:

Traverse the tree upward from the newly-added node executing the following steps:
If the newly-added node is the root, stop.
Set the current node equal to the newly-added node.
loop Go to the parent node of the current node (setting the current node equal to the parent node)
If the current node is already in the tree representation, stop.
Otherwise, if the current node has a descendant node along another branch, add the current node as a structural node.
Otherwise, if the current node is the root, stop.
Otherwise, repeat the loop.

Figure 4:
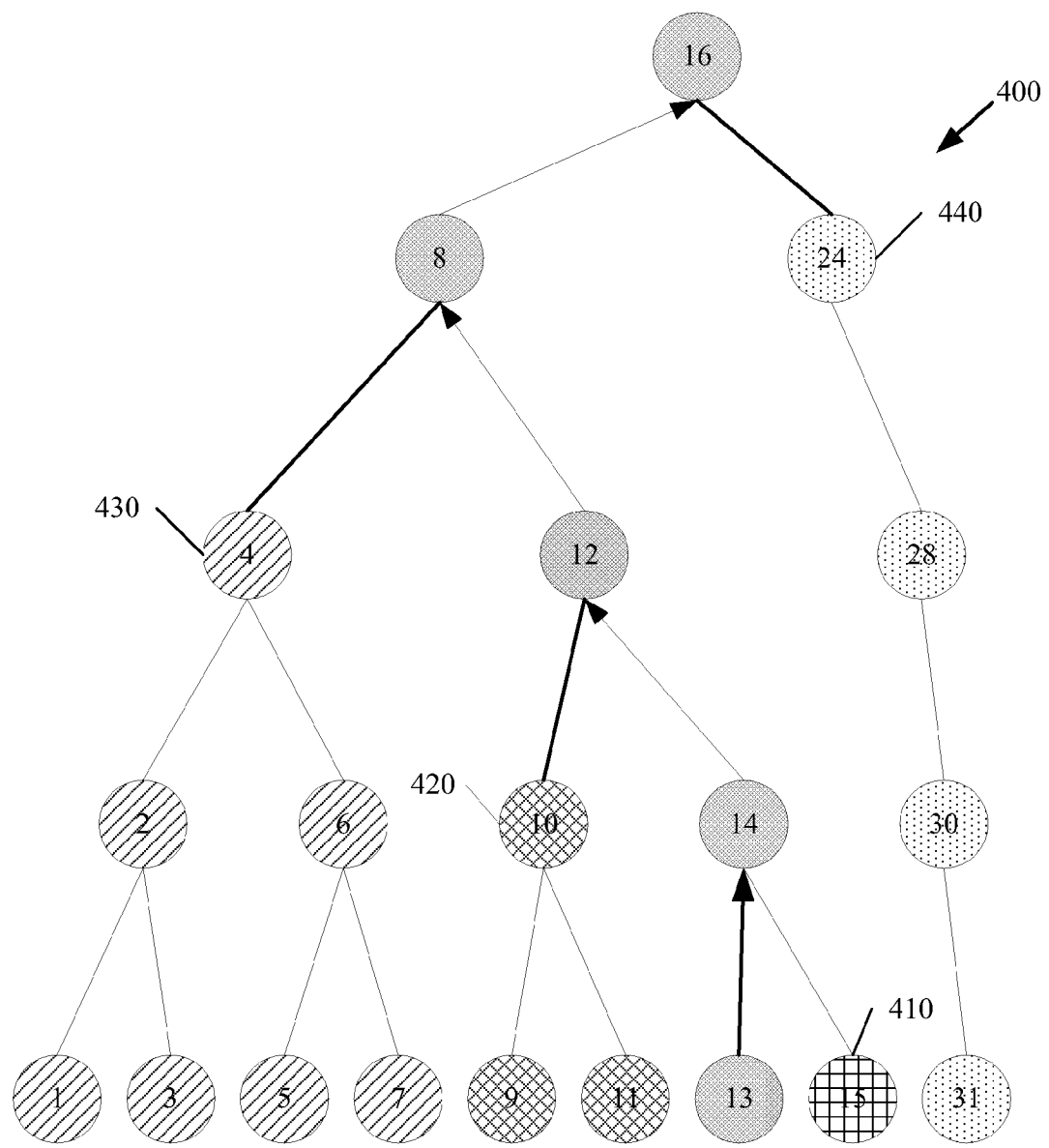
FIG. 4 depicts an example tree to illustrate the freeing of an integer in accordance with embodiments of the invention.

Turning to FIG. 4, depicted is a tree used to illustrate the process described by the above pseudocode. In the example illustrated by tree 400, the node 13 is added to a tree representing an allocation. That tree is not shown. Tree 400 does not represent the allocation.

The process begins by testing whether the newly-added node, node 13, is the root (line 2). It is not, and current node is set to 13 (line 3). Next, the loop of line 4 is started. The current node is reset to node 14, the parent of node 13. In the diagram of FIG. 4, the successive parent nodes are shaded in solid gray, and the arrows indicate the order of traversing the tree upwards to the successive parents. Assume that node 14 is not present in the tree representing the allocation (line 6). Then, subtree 410, the subtree of node 14 along the right branch, is checked for nodes (lines 7-8). If subtree 410 has a node in the representation tree, then node 14 is added to the representation tree. Subtree 410 consists of a single node, node 15. In the diagram of FIG. 4, subtrees are uniformly shaded. If node 15 is not in the representation tree, then the process may be repeated. Successive parents are checked for nodes along another branch. In order, the test is applied to node 12 with subtree 420 consisting of nodes 9-11, to node 8 with subtree 430 consisting of nodes 1-7, and to node 16 with subtree 440 consisting of nodes 24, 28, 30, and 31. At each stage, if the parent node is already in the representation tree, the process halts. There is no need to add structural nodes. If there is a node in the subtree of the parent node along the other branch, then the parent node is added to the representational tree as a structural node. Otherwise, if the parent node is the root, the process is complete and no structural node is added.

Revising the tree structure (element 330) may also include deleting a subtree representing only free integers and replacing it with a pointer to indicate a uniformly free subtree. In some embodiments, a subtree may be collapsed by the following steps:

Change the representation of a node to represent the freeing of an integer.
loop If the node is all free, check whether the subtree rooted at the node is uniformly free.
If so, replace the node with a pointer in the parent of the node indicating an all-free subtree and repeat the loop with the parent of the node.
Otherwise, stop.

Figure 5A:
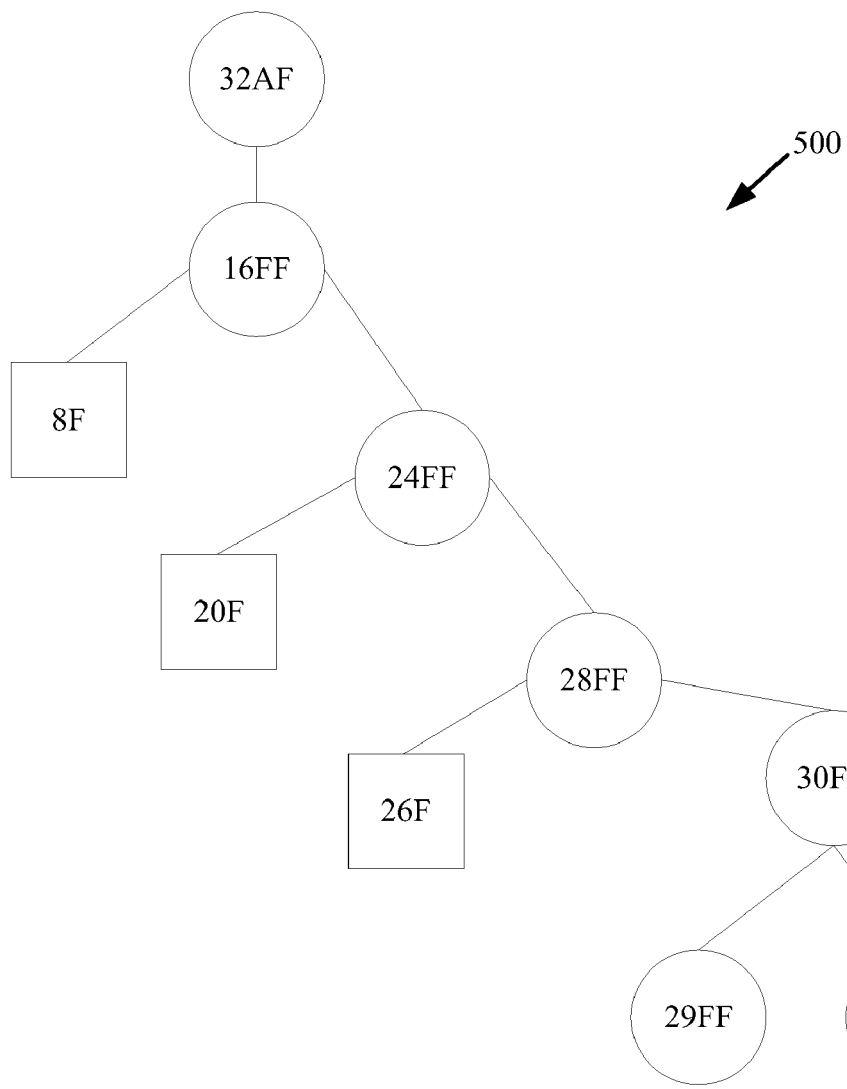
FIG. 5A depicts another example representation of the allocation of integers via an ordered binary tree in accordance with embodiments of the invention.
Figure 5B:
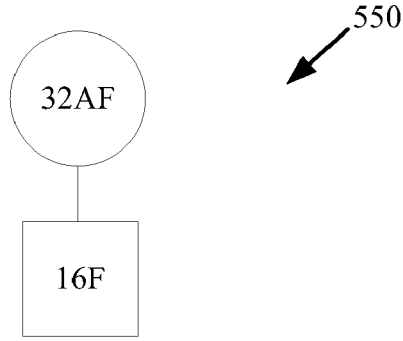
FIG. 5B depicts an exemplary pruning of the representation of FIG. 5A in accordance with embodiments of the invention.

FIGS. 5A and 5B illustrate the process. Tree 500 of FIG. 5A contains nodes, represented by circles; and pointers to subtrees, represented by squares. In tree 500, each node with number n describes the allocation of two integers, 2n−1 and 2n. For example, node 30 represents the allocation of integers 59 and 60. An "F" represents a free node and an "A" represents an allocated integer. Thus, the "FA" label in node 30 represents that integer 59 is free and integer 60 is allocated. The label "F" with a pointer to a subtree represents that every integer represented by the subtree is free. Thus, pointer 26 is a pointer to nodes 25, 26, and 27, representing integers 49 through 54. The label "F" on pointer 26 represents that all of those integers are free. In tree 500, the only allocated integers are 63, represented by node 32 and 60, represented by node 30. Integers 1-59, and 61-62 are free.

In FIG. 5B, integer 60, represented in node 30 in FIG. 5A, has been freed. As a result, all integers represented by the subtree at node 16 are free. In tree 550, these nodes have been replaced with a pointer labeled with the letter "F." The process of transforming the representation from tree 500 of FIG. 5A to tree 550 of FIG. 5B begins by changing the representation of node 30 to 30FF (line 7), to represent that node 60 was also free. After the change, node 30 represented only free integers. Next, the subtree rooted at node 30, consisting of nodes 30, 29, and 31 is checked (lines 8-9). All the nodes represent only free integers. Thus, the subtree is uniformly free and is replaced by a pointer. The process is continued, going up the tree to node 28, the parent of node 30 (lines 10-11). The subtree rooted at node 28 is uniformly free, because the node is uniformly free, and its two subtrees, rooted at nodes 26 and 30, are uniformly free. Continuing upward to parents, the subtrees rooted at 24 and 26 are also uniformly free. Each node is replaced by a pointer to the subtree (lines 10-11). The process stops with node 32, which is not all-free (line 12). The "A" in data structure of node 32 indicates that the integer 63 is allocated.

Returning to FIG. 3, revising the tree structure (element 330) may also include pruning the tree when the maximum allocated integer is freed, in embodiments which keep track of that variable. The value of the variable must now be decremented to the integer that was the next highest allocated. Any free integers between the new max_allocated and the previous max_allocated may be omitted from the tree structure.

Figure 6A:
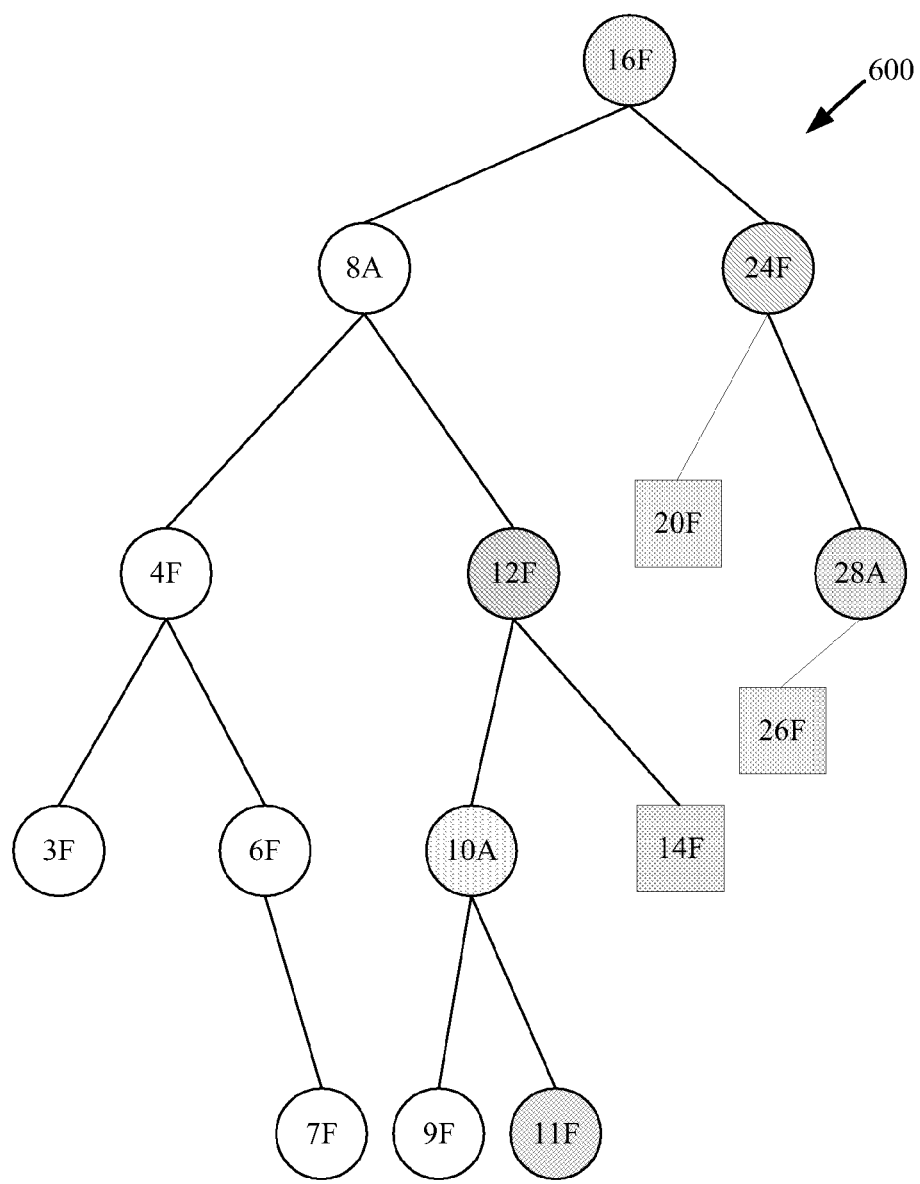
FIG. 6A depicts another example representation of the allocation of integers via an ordered binary tree in accordance with embodiments of the invention.
Figure 6B:
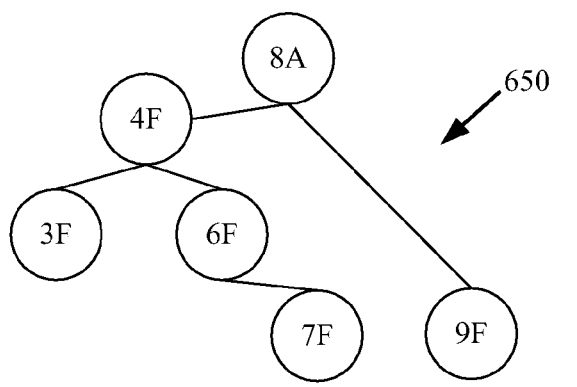
FIG. 6B depicts an exemplary collapsing of a subtree of FIG. 6A in accordance with embodiments of the invention.

FIGS. 6A and 6B illustrate the process of pruning the tree. The representation of tree 600 of FIG. 6A is similar to the representation of tree 500 of FIG. 5A. Tree 600 contains nodes, represented by circles, and pointers to subtrees, represented by squares. In tree 600, each node describes the allocation of the integer equal to its node number. Thus, node 8 describes the allocation of the integer 8. The label "A" designates a free integer and the label "F" designates a free integer. Thus, the label "A" with node 28 indicates that integer 28 is allocated, and the label "F" with nodes 11, 12, 16, and 24 designate that the corresponding integers are free. In addition, the label "F" with the subtrees 14, 20 and 26 indicate that the integers represented by the corresponding subtrees are free. The subtree at 14 includes nodes 13, 14, and 15; the subtree at 20 includes nodes 17 through 23; and the subtree at node 26 includes nodes 25, 26 and 27. Therefore, all of those integers are free. In FIG. 6A, max_allocated=28. Integers 11 through 27 are free.

Tree 650 of FIG. 6B shows the result of pruning tree after integer 28 is freed. Max_allocated is now set to 10. Max_free, the maximum free integer less than max_allocated, is now set to 9. Thus, all nodes greater than 10 may be deleted from tree 650, because the tree need only directly represent integers up to max_free. The resulting tree 650 has 6 nodes, instead of the 15 nodes and subtrees of tree 600 of FIG. 6A. In some embodiments, the process of going from tree 600 of FIG. 6A to tree 650 of FIG. 6B may be performed by:

removing from the tree all nodes greater than the new max_allocated
joining each node or subtree unconnected to an ancestor to its nearest ancestor, if available.

In performing the first step, nodes 10, 11, 12, 16, 24, and 28, and subtrees 14, 20, 26, and 30 are removed from tree 600. The result left node 9 unconnected to an ancestor. In tree 650, node 9 is connected to its nearest remaining ancestor, node 8, since nodes 10 and 12 were deleted. Node 8 is no longer connected to an ancestor in tree 650. Node 16 was removed and no ancestors remain. Accordingly, node 8 becomes the root of tree 650.

In embodiments that follow an algorithm similar to the tree-pruning algorithm described above, the pruning process may completely collapse the tree when all integers are freed and none are allocated. In that case, max_allocated and max_free are both set to 0, and the tree representing the allocation is empty. This method of representing a tree after all the allocated integers are free may save memory. In contrast, other algorithms may maintain all free integers in the tree. As a result, the size of the tree representing the allocation is proportional to the number of integers ever allocated.

Returning to FIG. 3, the representation of freeing an integer also includes updating the global variables (element 335). As the previous discussion disclosed, when the current max_allocated integer is free, then max_allocated must be reduced to the next-highest allocated integer. In addition, max_free may need to be reset, if the newly free integer is higher than the current value of max_free. For instance, in some representation of an allocation, max_allocated may equal 15 and max_free may equal 3. If 13 is then freed, max_free may be reset to 13.

The method of flowchart 300 also includes representing the allocating an integer (element 340). In the embodiment of FIG. 3, representing the allocating includes revising a data structure to represent the integer (element 345). The data structure may be the data structure of a node that designates the state of the integer. For example, a 1 may be changed to 0 in a binary number or an "F" in a text field may be changed to "A."

The representation of allocating the integer may also include revising the tree structure (element 350). In many cases, the process is the reverse of the revision of the tree structure used to represent the freeing of an integer. Thus, a node may be deleted when it represents only allocated integers. For example, in FIG. 1B, after the allocation of the integer 13, the node representing the integer, node 13, was deleted from tree 140, leaving the empty tree 150. In addition, structural nodes that are no longer necessary may be deleted. Turning again to FIG. 1B, after the allocation of the integer 3, node 3 may be deleted from tree 130, because it represents only allocated integers. In addition, node 8 is no longer needed, and the resulting tree 140 consists of a single node, 13. The process may be carried out as follows:

Check if the node representing the integer represents only allocated integers
If so, check if at most one branch of descendants of the node represents free integers
If so, delete the node and connect the subbranch to a parent, if the parent exists.
Repeat the process for the nearest ancestor of the node present in the representation tree.
Otherwise, stop.

The process is the reverse of the process of adding structural nodes discussed in connection with FIG. 4, and may be illustrated in connection with FIG. 4. As before, tree 400 of FIG. 4 illustrates the traversal of nodes used in the process and is not necessarily a tree representing the current allocation. The process will be discussed after the allocation of the integer 13. The process begins by checking whether node 13, which represents the integer 13 in the representation of tree 400, represents only allocated integers. In the example of FIG. 4, the check is satisfied, since node 13 represents only the integer 13. The process continues by checking whether there are multiple branches of descendants from node 13 with free integers. In the example of FIG. 4, the check is satisfied, since node 13 has no descendants.

The process continues by locating the nearest ancestor of node 13 in the representation tree. In the diagram of FIG. 4, the ancestor nodes are shaded in solid gray, and arrows indicate the direction of search. The search examines node 14, 12, 8, and 16 in succession to determine if a node is in the representation tree of the allocation. If so, the process tests whether the node represents only allocated integers. If so, the process tests whether at most one branch of descendants of the node represents free integers. In tree 400, subtree 410 indicates the nodes on the right branch of node 14, subtree 420 indicates the nodes on the left branch of node 12, subtree 430 indicates the nodes on the left branch of node 8, and subtree 440 indicates the nodes on the right branch of node 16. If the test is satisfied, the node is removed. The process stops with the first ancestor of node 13 present in the representation tree.

Revising the tree structure for the allocation of an integer (element 350) may also include expanding a uniformly free subtree when an integer represented by the subtree is allocated. The expansion may, for example, transform tree 550 of FIG. B to tree 500 of FIG. A. The process may be carried out by proceeding downward from the root of the subtree to the node representing the integer. At each step:

replace the current subtree by the root (a node) of the subtree
connect the subtrees of the node to the node
if the node represents the integer, change the data structure to indicate the representation.
Otherwise, go to the subtree of the node that includes the integer and repeat.

Suppose tree 550 of FIG. 5B represents the current allocation, and the state of integer 60, represented by node 30, is changed from free to allocated. The above process begins by expanding subtree 16 into node 16, with subtrees 8 and 24. Node 30 is in the path of subtree 24. Thus, the process continues by expanding subtree 24 into node 24 with subtrees 20 and 28. Node 30 is on the path of subtree 28. The process continues by expanding subtree 28 into node 28 with subtrees 26 and 30. Subtree 30 is on the path to node 30, so it is expanded into node 30 and subtrees 29 and 31. Finally, the data structure of node 30 is revised to indicate that integer 60 is allocated. The result of the expansion of tree 550 of FIG. 5B to represent the allocation of the integer 60 is tree 500 of FIG. 5A.

In many embodiments, the reversing of the pruning of FIGS. 6A and 6B may not occur. The reverse operation might be required if the integer 28 were allocated in the representation of FIG. 6B. In many embodiments, however, the smallest available (free) integer is allocated. In those embodiments, the integer 3, the smallest free integer, would be allocated.

Returning to FIG. 3, the representation of allocating an integer may also include updating global variables. In some embodiments, a global variable, such as max_allocated, may keep track of the largest allocated integer. Max_allocated may be incremented if a larger integer is allocated. In further embodiments, max_allocated may be allocated only if all of the integers from 1 to max_allocated are already allocated. In these further embodiments the smallest available integer may be used to fulfill a request for an allocation. Thus, an integer greater than max_allocated would be selected only if all the smaller integers were already allocated.

In these further embodiments, then max_free is allocated only if it is the only free integer less than max_allocated. In such case, after it is allocated, there are no free integers below max_allocated, and max_free is set to 0. If there additional allocations or freeing of integers (element 360), elements 320 through 340 of FIG. 3 may be repeated. Otherwise, the method of FIG. 3 may end.

The elements of flowchart 300 are for illustration and not for limitation. In alternative embodiments, additional elements may be included, some of the elements of flowchart 300 may be omitted, or the elements may be performed in a different order. In other embodiments, the tree used to represent allocations may be other than binary. The tree may have 3 or more branches from some of the nodes. In several embodiments, an order of the nodes other than preorder may be used. In a few embodiments, data structures other than alphanumeric labels and binary numbers may be used to represent the allocation of integers. In many embodiments, a node may represent the allocation of a different number of integers than 1, 3, or 64. In some embodiments, the relationship between node number and integer number may differ from the relationships illustrated by the above discussions. In further embodiments, the nodes may be labeled with labels other than numbers.

In particular, the algorithms described above in connection with FIGS. 4A through 6B are for illustration and not for limitation. Other algorithms may be used to produce similar results. In many embodiments, a revised tree may be constructed by starting with the current tree and making changes. In some embodiments, however, a revised representation tree may be constructed by determining the current state of the allocation, creating an empty tree, and adding nodes as necessary.

Figure 7:
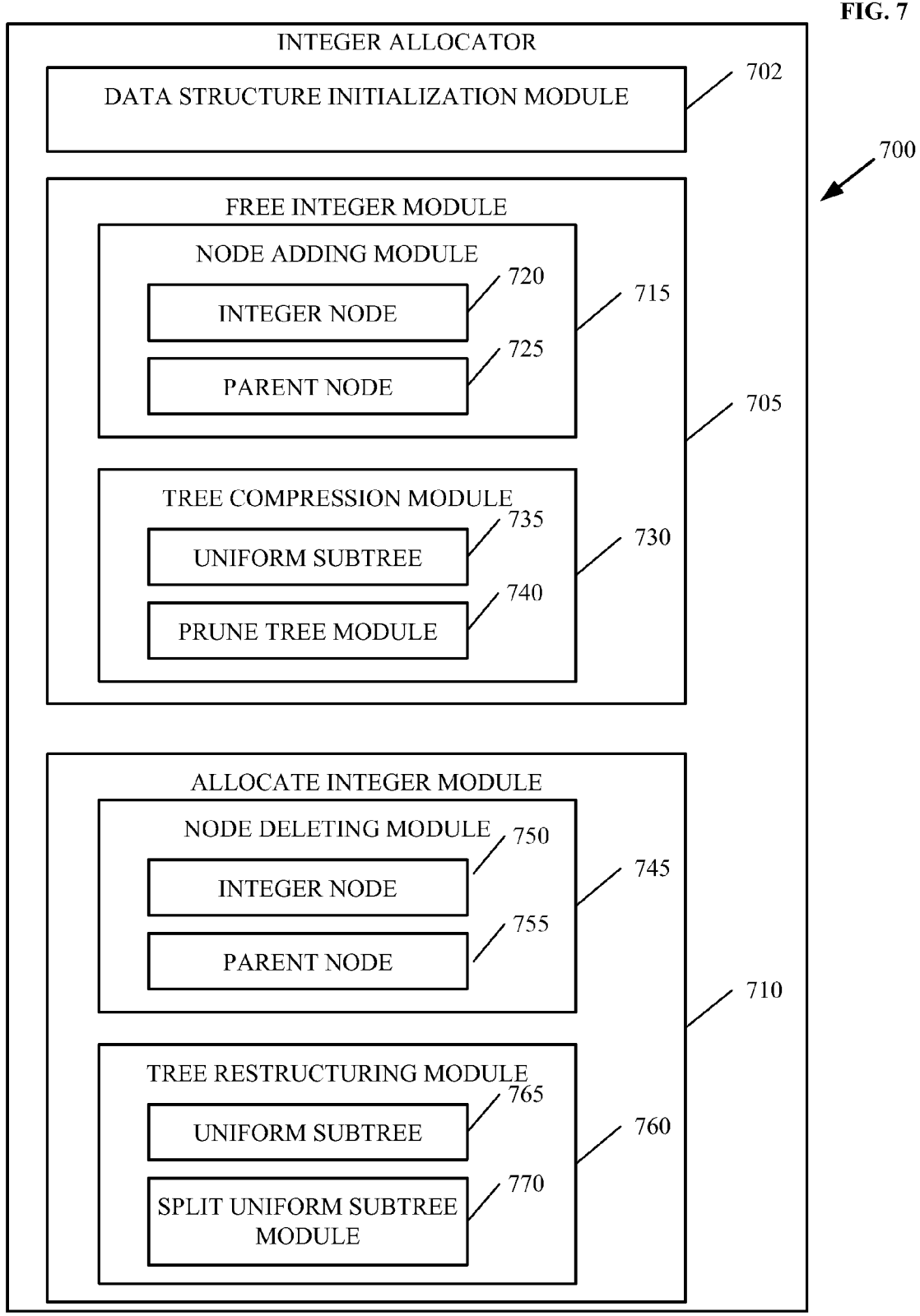
FIG. 7 depicts an exemplary apparatus to represent the allocation of integers in accordance with embodiments of the invention.

Turning to FIG. 7, disclosed is a block diagram illustrating an exemplary apparatus to represent the allocation of integers in accordance with embodiments of the invention. Integer allocator 700 may represent allocations of integers used, for example, by an operating system. In many embodiments, when requested to allocate an additional integer, integer allocator 700 may select the integer for allocation and update the representation. In further embodiments, however, integer allocator 700 may be informed when an allocated integer is freed, and may not control the choice of freed integer.

Integer allocator 700 includes data structure initialization module 702 to initialize the data structures used to represent the state of an allocation of integers. The data structures may include a tree structure whose nodes represent the state of allocations of integers. Data structures associated with each node may represent the state of allocations of a subset of the integers available for allocation. In some embodiments, for example, the data structures of a node may represent the state of allocations of a consecutive set of 64 integers. The data structures may also include global variables. In a few embodiments, the variables may include a variable to represent the largest integer which has been allocated (herein designated as max_allocated), and a variable to represent the largest integer available for allocation less than max_allocated (herein designated as max_free). In these embodiments, all integers n, for which max_free<n≦max_allocated, may be allocated; and all integers n, for which n>max_allocated may be free.

Integer allocator 700 includes free integer module 705, for representing the freeing of an integer, and allocate integer module 710, for representing the allocating of an integer. When an allocated integer is freed, free integer module 705 may update the data structures to represent the new state of the allocation. In particular, it may update a data structure in a node representing the state of allocation of the integer. In addition, free integer module 705 may update the tree structure to represent the new allocation. Node adding module 715 may add nodes to a tree structure. Integer node 720 may add a node representing the freed integer. In FIG. 1B, for example, the freeing of integer 3 from the allocation represented by tree 120 resulted in adding node 2 to tree 120. In the example, the data structure of node 2 referenced the state of allocation of integer 3. Parent node 725 may add structural nodes. In the previous example, parent node 725 may add node 8 after the addition of node 2. The resulting tree, tree 130, contained two nodes more than tree 120.

Tree compression module 730 may compress a tree structure after the revising of data structures to represent the freeing of an integer. Uniform subtree module 735 may compress a subtree consisting uniformly of free integers, such as subtree 16 of tree 550 of FIG. 5B. Prune tree module 740 may prune a tree after the freeing of the largest allocated integer, as illustrated in the process of transforming tree 600 of FIG. 6A into tree 650 of FIG. 6B.

When an integer is allocated, allocate integer module 710 may update the data structures to represent the new allocation. In particular, it may update the state of a data structure in a node representing the state of allocation of the integer. In addition, allocate integer module 710 may update the tree structure to represent the new allocation. Node deleting module 745 may delete nodes from a tree structure when all of the integers represented by the nodes have been allocated. Integer node 750 may delete the node referencing the newly allocated integer. In the example of FIG. 1B, when integer 13 is allocated from the allocation represented by tree 140, integer node 750 may delete node 13 from tree 140, leaving tree 150, the empty tree. Parent node 755 may delete structural nodes rendered unnecessary by the deletion of other nodes. After the allocation of the integer 3 from the allocation represented by tree 130 of FIG. 1B, integer node module 750 may delete node 2, which represents the integer 3. Parent node 755 may then delete node 8, which is no longer needed to connect nodes 2 and 13. The resulting tree, 140, represents an allocation in which only the integer 13 is free.

Tree restructuring module 760 may further restructure a tree after the allocation of an integer. Uniform subtree module 765 may eliminate a subtree consisting uniformly of allocated integers. Split uniform subtree module 770 may split up a subtree uniformly representing free integers. After the allocation of one of the integers, the subtree may be replaced by ordinary nodes. This splitting up of a uniform subtree was illustrated by the transformation from tree 650 of FIG. 6B to tree 600 of FIG. 6A.

The module of FIG. 7 is for illustration and not limitation. An apparatus for monitoring applications active on a plurality of computers in accordance with embodiments of the invention may omit some of the modules shown, may include additional modules, or may contain different arrangements of modules. In other embodiments, some of the functions of a free integer module and an allocate integer module may be differently divided, or may be contained in other modules, as may occur to those of skill in the art.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

It will be apparent to those skilled in the art having the benefit of this disclosure that the present invention contemplates methods and arrangements for representing the allocation of integers. It is understood that the form of the invention shown and described in the detailed description and the drawings are to be taken merely as examples. It is intended that the following claims be interpreted broadly to embrace all the variations of the example embodiments disclosed.

Although the present invention and some of its advantages have been described in detail for some embodiments, it should be understood that various changes, substitutions and alterations can be made herein without departing from the spirit and scope of the invention as defined by the appended claims. Although an embodiment of the invention may achieve multiple objectives, not every embodiment falling within the scope of the attached claims will achieve every objective. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method, in a data processing system, for representing the allocation of integers, the method comprising:
   generating a set of integers, wherein integers in the set of integers are either allocated or unallocated, and wherein when an integer from the set of integers is allocated, the allocated integer represents a system resource of the data processing system;
   representing a first allocation of integers, from the set of integers, via a set of nodes of a tree, wherein a data structure in a node represents, for each integer in the set of integers represented by the node, whether the integer is allocated or unallocated (free); and
   representing a subsequent allocation, comprising adding a new node to the set of nodes of the tree, wherein:
      the subsequent allocation consists of freeing of an integer allocated in the first allocation; and
      a data structure of the new node represents that the integer allocated in the first allocation is free, wherein nodes of the tree comprise nodes representing sets of integers that comprise an unallocated (free) integer and a minimum set of parent nodes required to preserve a structure of the tree with regard to linking nodes representing sets of integers that comprise an unallocated (free) integer, and wherein the tree does not comprise nodes representing sets of integers that comprise only allocated integers.

2. The method of claim 1, further comprising adding an additional node to the tree, wherein:
   the additional node is an ancestor of the new node;
   the tree comprises a third node, a data structure of the third node representing that another integer is free;
   the third node is a descendant of the additional node; and
   the third node is not a descendant or an ancestor of the new node.

3. The method of claim 1, further comprising representing a third allocation, comprising deleting a first node from the set of nodes of the tree, wherein:
   the third allocation consists of allocating an integer not allocated in the first allocation; and
   the data structure of the deleted node represented that the integer was free.

4. The method of claim 3, further comprising deleting an additional node from the tree, wherein:
   before deletion of the first node and the additional node, the additional node was the parent of the first node in the tree; and
   the integers represented by the subtree of the tree rooted at the first node are all allocated.

5. The method of claim 1, further comprising:
   deleting the nodes of a first subtree from the tree, wherein the data structures of the nodes of the first subtree all represent free integers;
   deleting the nodes of second subtree from the tree, wherein the data structures of the nodes of the second subtree all represent allocated integers; and
   deleting the nodes of a third subtree from the tree, except for nodes of a subtree of the third subtree, wherein:
      the data structures of the deleted nodes of the third subtree represent allocated integers; and
      the data structure of at least one node of the subtree of the third subtree represents free integers.

6. The method of claim 1, wherein representing a first allocation of integers via a set of nodes of a tree comprises representing a first allocation of integers via a set of nodes of a binary tree.

7. The method of claim 1, wherein representing a first allocation of integers via a set of nodes of a tree comprises representing only the integers from 1 to the maximum free integer via the set of nodes of the tree.

8. The method of claim 1, wherein representing a first allocation of integers via a set of nodes of a tree comprises representing a first allocation of integers via a set of nodes of a binary tree, wherein the data structure in a node represents whether a set of 64 integers is allocated or free.

9. An apparatus to represent the allocation of integers, the apparatus comprising:
   memory;
   one or more processors; and
   a module to represent the allocation of integers via a set of nodes of a tree, wherein:
   a set of integers is generated;
   the integers in the set of integers are either allocated or unallocated;
   when an integer from the set of integers is allocated, the allocated integer represents a system resource of the apparatus;
   a data structure in a node represents, for each integer in the set of integers represented by the node, whether the integer is allocated or unallocated (free);

the module comprising a node-adding submodule to add a new node to the set of nodes of a tree to represent the freeing of an integer; and a data structure of the new node represents that the integer allocated in the first allocation is free, wherein nodes of the tree comprise nodes representing sets of integers that comprise an unallocated (free) integer and a minimum set of parent nodes required to preserve a structure of the tree with regard to linking nodes representing sets of integers that comprise an unallocated (free) integer, and wherein the tree does not comprise nodes representing sets of integers that comprise only allocated integers.

10. The apparatus of claim 9, the apparatus further comprising:

a node-deleting submodule to delete a first node from the set of nodes of a tree to represent the allocating of an integer free in the first allocation, wherein a data structure of the deleted node represented that an integer in the first allocation was free.

11. The apparatus of claim 9, wherein the node-adding module is to add an additional node to the tree, wherein:
the additional node is an ancestor of the new node;
the tree comprises a third node, a data structure of the third node representing that another integer is free;
the third node is a descendant of the additional node; and
the third node is not a descendant or an ancestor of the new node.

12. The apparatus of claim 10, wherein the node-deleting module is to delete an additional node from the tree, wherein:
before deletion of the first node and the additional node, the additional node was the parent of the first node in the tree; and
the integers represented by the subtree of the tree rooted at the first node are all allocated.

13. A computer program product to represent the allocation of integers, the computer program product comprising a non-transitory computer useable medium having a computer readable program, wherein the computer readable program when executed on a computer causes the computer to:
generate a set of integers, wherein integers in the set of integers are either allocated or unallocated, and wherein when an integer from the set of integers is allocated, the allocated integer represents a system resource of the data processing system;
represent a first allocation of integers, from the set of integers, via a set of nodes of a tree, wherein a data structure in a node represents, for each integer in the set of integers represented by the node, whether the integer is allocated or unallocated (free); and
represent a subsequent allocation, comprising adding a new node to the set of nodes of the tree, wherein:
the subsequent allocation consists of freeing of an integer allocated in the first allocation;
a data structure of the new node represents that the integer allocated in the first allocation is free,
nodes of the tree comprise nodes representing sets of integers that comprise an unallocated (free) integer and a minimum set of parent nodes required to preserve a structure of the tree with regard to linking nodes representing sets of integers that comprise an unallocated (free) integer, and
the tree does not comprise nodes representing sets of integers that comprise only allocated integers.

14. The computer program product of claim 13, wherein the computer readable program when executed on a computer further causes the computer to add an additional node to the tree, wherein:
the additional node is an ancestor of the new node;
the tree comprises a third node, a data structure of the third node representing that another integer is free;
the third node is a descendant of the additional node; and
the third node is not a descendant or an ancestor of the new node.

15. The computer program product of claim 13, wherein the computer readable program when executed on a computer further causes the computer to represent a third allocation, the representing a third allocation comprising deleting a first node from the set of nodes of the tree, wherein:
the third allocation consists of allocating an integer not allocated in the first allocation; and
the data structure of the deleted node represented that the integer was free.

16. The computer program product of claim 15, wherein the computer readable program when executed on a computer further causes the computer to delete an additional node from the tree, wherein:
before deletion of the first node and the additional node, the additional node was the parent of the first node in the tree; and
the integers represented by the subtree of the tree rooted at the first node are all allocated.

17. The computer program product of claim 13, wherein the computer readable program when executed on a computer further causes the computer to:
delete the nodes of a first subtree from the tree, wherein the data structures of the nodes of the first subtree all represent free integers;
delete the nodes of second subtree from the tree, wherein the data structures of the nodes of the second subtree all represent allocated integers; and
delete the nodes of a third subtree from the tree, except for nodes of a subtree of the third subtree, wherein:
the data structures of the deleted nodes of the third subtree represent allocated integers; and
the data structure of at least one node of the subtree of the third subtree represents free integers.

18. The computer program product of claim 13, wherein the computer readable program which when executed on a computer causes the computer to represent a first allocation of integers via a set of nodes of a tree comprises:
a computer readable program which when executed on a computer causes the computer to represent a first allocation of integers via a set of nodes of a binary tree.

19. The computer program product of claim 13, wherein the computer readable program which when executed on a computer causes the computer to represent a first allocation of integers via a set of nodes of a tree comprises:
a computer readable program which when executed on a computer causes the computer to represent only the integers from 1 to the maximum free integer via the set of nodes of the tree.

20. The computer program product of claim 13, wherein the computer readable program which when executed on a computer causes the computer to represent a first allocation of integers via a set of nodes of a tree comprises:
a computer readable program which when executed on a computer causes the computer to represent a first allocation of integers via a set of nodes of a binary tree, wherein the data structure in a node represents whether a set of 64 integers is allocated or free.

21. The method of claim 1, further comprising:
setting a value of a maximum allocated parameter to a highest value integer that has an allocated state;
setting a value of a maximum free parameter to a highest value integer that has an unallocated (free) state, wherein:
integers greater than the maximum allocated parameter value are not represented as nodes in the tree,
integers greater than the maximum free parameter value are not represented as nodes in the tree, and
the tree comprises nodes corresponding to one or more of integers that are less than the maximum free parameter.

* * * * *